US007043631B2

(12) United States Patent
Baum et al.

(10) Patent No.: US 7,043,631 B2
(45) Date of Patent: May 9, 2006

(54) ARRANGEMENT AND METHOD FOR MODIFYING THE FUNCTIONALITY OF A SECURITY MODULE

(75) Inventors: Volker Baum, Berlin (DE); Dirk Rosenau, Berlin (DE)

(73) Assignee: Francotyp Postalia AG & Co. KG, Birkenwerder (DE)

( * ) Notice: Subject to any disclaimer, the term of this patent is extended or adjusted under 35 U.S.C. 154(b) by 831 days.

(21) Appl. No.: 10/193,043

(22) Filed: Jul. 11, 2002

(65) Prior Publication Data

US 2003/0014673 A1 Jan. 16, 2003

(30) Foreign Application Priority Data

Jul. 16, 2001 (DE) ................................ 101 37 505

(51) Int. Cl.
*G06F 1/26* (2006.01)

(52) U.S. Cl. .......................... 713/2; 713/161; 713/182; 713/200; 713/201

(58) Field of Classification Search .................... 713/2, 713/161, 182, 200, 201
See application file for complete search history.

(56) References Cited

U.S. PATENT DOCUMENTS

| | | | | |
|---|---|---|---|---|
| 4,849,927 | A | | 7/1989 | Vos |
| 5,144,659 | A | * | 9/1992 | Jones .......................... 713/16 |
| 5,359,659 | A | * | 10/1994 | Rosenthal ..................... 726/24 |
| 5,386,469 | A | * | 1/1995 | Yearsley et al. ............ 713/190 |
| 5,421,006 | A | * | 5/1995 | Jablon et al. ................. 714/36 |
| 5,778,070 | A | | 7/1998 | Mattison |
| 5,844,986 | A | | 12/1998 | Davis |
| 6,151,657 | A | | 11/2000 | Sun et al. |

FOREIGN PATENT DOCUMENTS

| | | |
|---|---|---|
| EP | 0 402 683 | 12/1998 |
| EP | 1 087 294 | 3/2001 |
| EP | 1 100 014 | 5/2001 |
| WO | WO 98/20461 | 5/1998 |

* cited by examiner

*Primary Examiner*—Thomas R. Peeso
(74) *Attorney, Agent, or Firm*—Schiff Hardin LLP

(57) ABSTRACT

An arrangement and a method for modifying the functionality of a security module employ a start loading program stored in a FLASH program memory for reprogramming the FLASH program memory by copying a portion of the start loading program into a main memory of the security module. Data of at least a part of an application program, an appertaining certificate code and identifier data are offered in the communication interface of the security module. The data of the part of the application program are stored on a free memory location of the FLASH program memory when the identifier data characterize a successor status for the stored status. The authenticity of the loaded part of the application program is checked with the certificate code, and given authenticity of the loaded part of the application program, it is stored as valid.

15 Claims, 2 Drawing Sheets

ARRANGEMENT AND METHOD FOR MODIFYING THE FUNCTIONALITY OF A SECURITY MODULE

BACKGROUND OF THE INVENTION

1. Field of the Invention

The present invention is directed to an arrangement and method for modifying the functionality of a security module.

2. Description of the Prior Art

Security modules operate in a potentially unfriendly environment in products representing different functionalities, such as automatic teller machines, automatic transport ticket machines, cash registers, electronic purses, computers for personal use (laptops, notebooks, organizers), cell phones and devices that combine several of these products. The assemblies are cast with a casting compound. A postal security module is used in a postage meter machine or mail processing machine or a computer with mail-processing function (PC frankers).

European Application 417 447 discloses the use of special modules in electronic data processing systems that are equipped with means for protecting against a break-in into their electronics. Such modules are included among security modules as that term is used herein.

Modern postage meter machines or other device for franking postal matter are equipped with a printer for printing the postage stamp onto the postal matter, a controller for controlling the printing and the peripheral components of the postage meter machine, an accounting unit for debiting postage fees that are maintained in non-volatile memories, and a unit for cryptographically protecting the postage fee data. A security module (European Application 789 333) can have a hardware accounting unit and/or a unit for protecting the printing of the postage fee data. For example, the former can be realized as an ASIC (application specific integrated circuit) and the latter can be realized as an OTP (one-time programmable) processor. An internal OTP processor stores sensitive data (cryptographic keys) in a manner protected against readout. Such data, for example, are required for replenishing a credit. An encapsulation with a security housing offers further protection.

Further measures for the protection of a security module against intrusion are disclosed in German OS 198 16 572, German OS 198 16 571, European Application 1 035 516 (corresponding to co-pending U.S. application Ser. No. 09/522,621, European Application 1 035 517, European Application 1 035 518 (corresponding to co-pending U.S. application Ser. No. 09/522,619, filed Mar. 10, 2000), European Application 1 035 513 (corresponding to co-pending U.S. application Ser. No. 09/524,118, filed Mar. 13, 200), and German Utility Model 200 20 635 (corresponding to co-pending U.S. application Ser. No. 10/007,899, filed Nov. 5, 2001.

The various techniques that have been conventionally employed, such as encapsulation with a secure housing and the use of various event detectors that can cause the security module to erase security-relevant data (European Application 1 035 518 and German OS 200 20 635), can only offer a dependable protection against manipulation for the one particular functionality for which it is designed.

U.S. Pat. No. 4,528,644 discloses a method for customer-specific setting of the firmware of an electronic postage meter machine after the assembly thereof, whereby an input of a configuration message is stored in a non-volatile memory which collaborates with the operating program in order to adapt the postage meter machine to the customer's wishes. Further access to the configuration data is prevented after the end of the configuration. Beyond the secure environment at the manufacturer, however, it is difficult to provide a dependable protection against manipulation. Therefore, no security-relevant program data for achieving a different application functionality are installed outside the secure environment at the manufacturer.

Memories referred to as flash-EEPROMs are utilized as program memories in modern postal devices. These allow sector-by-sector erasure and storage of data as well as a byte-by-byte insertion of individual data into a memory area (sector). European Application 724 141 discloses a method for the input of data into a scale, whereby the appertaining memory areas in the flash-EEPROM of the scale are erased before a reprogramming is undertaken in order, for example, to at least partially modify a postage rate table. The data, which are preferably loaded via modem of a postage meter machine, for example JetMail®, are stored in compressed form in the flash-EEPROM and are decompressed before the application and stored in a separate application memory. A programmable security means also is provided in the scale that prevents an unauthorized erasure of data blocks in the flash-EEPROM memory areas. Sub-image datafiles and a control datafile are defined for the postage meter machine, that are downloaded into the memory of the postage meter machine from a data center together with the data intended for the scale. In addition to a dataset that, among other things, contains a version information, the processing status is stored in order to non-volatilely conserve the program status that was achieved prior to a program abort. However, no security-relevant program data are stored in the postage meter machine or in the scale.

An electronic device with flash memory and a method for reprogramming the flash program memory are disclosed in European Application 788 115. The programming of the flash program memory module ensues by processing a sub-program contained in a memory bank for this purpose, with the appertaining memory areas of the respectively other memory bank being erased before a reprogramming is undertaken. The program is usually longer or shorter than the free memory sector created by the erasure and thus cannot be fully utilized. In addition to the aforementioned limitation with respect to the complete utilization of the memory space, such a component is more expensive than a comparable component without multiple memory banks. Whether the reprogramming has been completed is determined by checking a checksum. It cannot thus be precluded that the device was reprogrammed with manipulated data.

Reprogrammable memory components (FLASH or EEPROM) can also be utilized for a function-specific program storage in postal security modules. The programming of these components can be undertaken by the manufacturer in a known way using various methods:

- programming of a program component with a programming adapter before the installation into the security module;
- programming of the program module by processing a sub-program contained in a memory bank of the program component for this purpose.

Compared to the second method, the first method has the disadvantage that a faulty programs cannot be replaced. The second method disadvantageously requires a module that has at least two different memory banks, which makes it more expensive given the aforementioned limitations on the use of the memory space. Special demands are made of postal security modules with respect to the replacement and the expandability of functions. The programming of the aforementioned program modules must not be capable of being implemented at arbitrary times and, in particular, not by every operator.

SUMMARY OF THE INVENTION

An object of the present invention is to meet the aforementioned, special demands with little outlay and while avoiding the disadvantages and to provide an arrangement and a method for modifying the functionality of a security module that assure a replacement of the functionality in status-dependent and authorized fashion.

In the inventive security module that has been developed, a microprocessor is utilized that enables the implementation of a program in a main memory. In addition to this main memory, a FLASH program memory is likewise utilized for the application-specific program. Both memories are connected to the processor via the bus.

At the time the security module is manufactured, a so-called "boot loader" is introduced as a start loading program into the program memory according to the aforementioned, first known method. A specific procedure for modifying the functionality of the other free program memory enables:

a) copying a program part of the start loading program into the main memory;

b) the implementation of this program part in the main memory for programming the free part of the program memory;

c) the verification of a program state that has been achieved during programming in order to be able to implement the program functionality in a state-dependent manner; and;

d) the authorization of the modified functioning of the reloaded program given authenticity thereof.

During its production, thus, the security module is programmed with program data and receives an identifier for a first basic condition. After being turned on, a first program part from the memory area of the program memory is copied into the main memory by means of a start-up program. The program state (or status) that has been achieved is verified in order to be able to implement the program functionality in a state-dependent manner. A state variable for the program state that has been achieved can, for example, be stored in the program memory or in a non-volatile memory of the security module. A light-emitting diode (LED) signals that the microprocessor is processing a second program part and is waiting for the modification of the program functionality of the free program memory. Via a communication interface contained in the security module, at least application program data are loaded into a free or non-active memory area of the program memory. Moreover, appertaining identifier data and a cryptographic signature of the application program are loaded into the non-volatile memory of the security module or are likewise loaded at the aforementioned or some other free or non-active memory area of the same program memory. To this end, the microprocessor, controlled by the second program part, first verifies the identifier of the previously stored program. The identifier describes the properties of the program data and is stored at a memory location having a specific address. If the identifier stored at this address represents a valid predecessor of the identifier of the new application program data, then the functionality of the first program part copied into the main memory is used in order to load the application program data obtained via the communication interface into the free memory area of the program memory. Before every programming of the program memory, it is additionally assured that no data can proceed into the currently active boot loader memory area, in order to prevent an overriding of the start loading program (boot loader). After all application program data have been stored in the free memory area of the program memory in this way, the employment of the application program is enabled when the application program has been verified. For example, a certification code is verified, preferably the cryptographic signature of the loaded application program data, and the loaded application program is identified as valid by a flag when the verification is successful, or the state of the application program that has been reached is updated in another suitable way. The appertaining identifier also is stored. The modification of the functionality thus has been ended. After the security module has been re-booted, the start loading program (boot loader) determines that the new program state indicates a valid application program functionality and now implements it. This is additionally indicated by a LED of a different color. A modification of the current functionality of the program memory is now no longer possible as long as the program state is not again modified.

In order to continue to assure this modification of the program functionality, each re-loaded functionality likewise contains a sub-program for copying and implementing programming instructions in the main memory. This functionality can likewise be called via the communication interface located in the security module. When called, the state variable changes such that the identifier of the program is in fact retained but the boot loader is notified at the next booting that the application-specific software now again represents a free program memory area. As a result, the boot loader is reactivated at the next booting and receives application program data.

The invention is based on the recognition that a fast microprocessor and additional function units (some of which are conventional) create a security module that meets all demands. The fast processor enables symmetrical and/or asymmetrical encryption methods to be utilized for different applications. Corresponding to the particular application, a real-time processing of events as well as a registration or, respectively, booking are enabled. An internal battery of the security module provides the voltage supply for a real-time clock and for components for non-volatile storage of the payload data, for permanent monitoring of all security-relevant functions as well as of the operational readiness of the security module when the system voltage of the device is switched off. In case of fault and when the security module is removed, a status change is stored in a fashion that can be interrogated. The status of the security module can also be interrogated by the device after the erasing. An existing display unit of the device can be utilized for signaling the status or a signaling means of the security module can be utilized as well.

DESCRIPTION OF THE PREFERRED EMBODIMENTS

Figure 1:
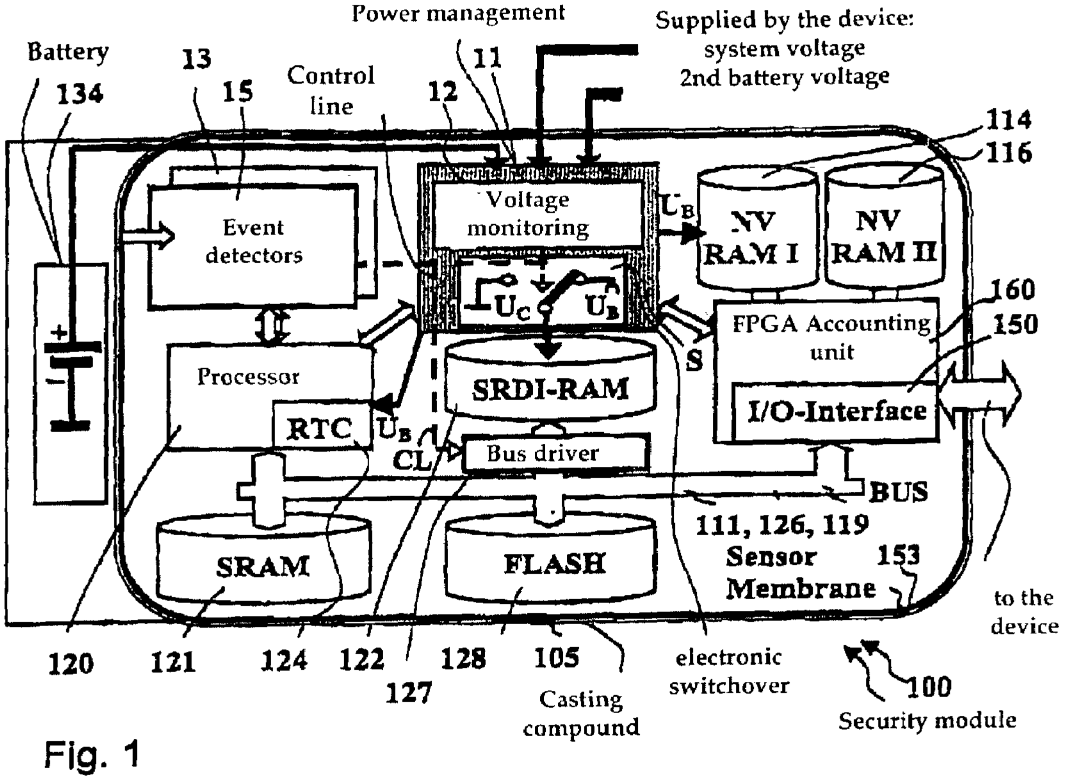
FIG. 1 is a block circuit diagram of a security module constructed and operating in accordance with the invention.

FIG. 1 shows a block circuit diagram of the security module 100, having the following assemblies:

a microprocessor 120 with internal real-time clock;

a program memory 128, for example a FLASH 512K×32, a main memory SRAM 121, for example an SRAM 64K×32, two non-volatile memories NVRAM I and NVRAM II, a main memory SRDI-RAM 122 (security relevant data items) with erase hardware and bus driver unit 127, a long-term battery 134, for example a lithium battery, a power administration and monitoring unit (power manager) 11 with voltage monitoring unit 12 having interfaces for supplying the system voltage (main power interface) and for supplying the battery voltage (post battery interface), event detectors including a destruction detection unit 16 that is connected to a membrane 163 embedded in a casting compound 105, and an unplugged detection unit 13, a specific circuit FPGA 160 with an I/O interface 150 for setting up a communication connection to a device. The communication interface 150 contains an internal controller and an eight byte communication buffer from which data that are read in first are read out first and forwarded.

The manufacturer device supplies a system voltage and, optionally, a second battery voltage. With the manufacturer device turned on, the security module 100 is operated with system voltage. For modifying the functionality, the security module 100 is equipped with a reprogrammable FLASH program memory 128 that stores a start loading program, and with a microprocessor 120 that partially copies the start loading program into the main memory SRAM 121. The integrated communication interface 150 of the specific circuit 160 enables the setup of a communication connection to the manufacturer device that offers the application program data for the security module. The microprocessor 120 is in communication via a bus with the main memory SRAM 121, with the FLASH program memory 128 and with the communication interface 150. The communication interface 150 offers data of at least one part of an application program, an appertaining certificate code and identifier data, and the microprocessor 120 is programmed, by the start loading program partially copied into the main memory 121, to store the data of the part of the application program at a free memory location of the FLASH program memory 128 when the identifier data identify a successor of the stored predecessor identifier, and to check the authenticity of the loaded part or parts of the application program by means of the certificate code and, given authenticity of the loaded part or parts of the application, to store the latter as valid.

The microprocessor 120 determines whether the identifier data identify a successor for the stored predecessor identifier by comparing the identifier data to corresponding comparison data that are stored in a further memory area of the FLASH program memory 128, wherein information data for a program that has already been loaded are listed. The identifier data include the program type, the version data and the revision data. A microprocessor type is employed that enables the execution of a program in a main memory 121 in order to reprogram the FLASH. The employment of an expensive FLASH program memory module with separate memory banks can thus be foregone.

The power manager 11 has a number of function units that, given a low power consumption, assure the functionability of the security module even when the device is turned off. The power manager 11 has a DC/DC converter (not shown) and a voltage regulator (not shown) for the corresponding operating voltages (3V, 5V and 8V), and a temperature and voltage monitoring circuit (not shown). These latter two can generate a reset signal. The supplied system voltage is monitored for upward or downward transgression of limit values. The DC/DC supplies a predetermined operating voltage $U_B$. A voltage generation unit generates therefrom all necessary voltages that the function units of the security module require.

When the device is turned off, only a real-time clock RTC and the main memory are supplied with battery voltage in addition to the monitoring circuits and the destruction detection unit. An uninterrupted supply of the battery-operated units has also been disclosed in the aforementioned German Utility Model 200 20 635. This includes, at least one of the postal memories, some of the detectors and the SRDI memory. Two independent batteries can be connected to the security module. The first battery voltage derives from the internal battery 134 that can be optionally supported by a second, separate battery.

Alternatively to the internal real-time clock, a separate real-time clock RTC 124 can be connected. The microprocessor 120, for example, is of the type ARM7, and the separate real-time clock is of the type EPSON RTC-4543. The microprocessor 120 is connected via a bus to the program memory FLASH 128, the main memory SRAM 121, the main memory SRDI-RAM 122 and to the specific circuit FPGA 160. The bus is shown with broad, white arrows. The specific circuit FPGA 160 is an application-specifically programmed FPGA (one-time programmable). The FPGA contains a hardware accounting unit (not shown), a drive circuit for two further memories NVRAM I and II as well as an input/output interface (digital interface of the security module; not shown) to the device (not shown). The specific circuit FPGA 160 is connected to two non-volatile memories 114 (NVRAM I) and 116 (NVRAM-II) that, among other things, contain the postally relevant data. The two non-volatile memories NVRAM I and II are physically separated and implemented in different technologies. They can be addressed for writing and reading by the processor, can be modified by the FPGA and can be read from outside the security module. One of the non-volatile memories is implemented in a mixed EEPROM-SRAM technology and the other is an SRAM with traditional technology.

The delivery of the system voltage (main power supply interface) and of the battery voltages to the interface has been identified with broad black arrows. Thin black arrows identify the supply of assemblies with a corresponding operating voltage from the power manager 11 or from the monitoring unit 12. Thin white arrows identify query and control lines.

The erase hardware include a portion of the power manager, a control line CL and a bus driver unit 127. The control lines of the destruction detection unit 15 and the voltage monitoring unit 12 are interconnected to form a shared control line CL that is shown with broken lines. The units 12 or 15 control an electronic switchover unit S via the common control line CL that selectively applies operating voltage $U_B$ or erase voltage $U_C$ (or ground potential $U_M$) to the VCC pin of the SRDI main memory 122. This SRDI-RAM memory is not directly connected to the processor bus. All digital signals are supplied via driver circuits of the bus driver unit 127 that have outputs that can be switched high-impedance.

The bus thus can be decoupled from the SRDI main memory 122. The bus driver unit 127 is likewise driven by the common control line CL.

The following detector and monitoring units monitor the proper operation of the security module:

Voltage monitoring unit 12 that is fashioned for battery voltage monitoring with self-holding;

Damage detection unit 16 for detection of mechanical damage of the security module with self-holding;

Unplugged detection unit 13 (host system loop) with self-holding;

Temperature sensor, and, further

Voltage monitoring units for monitoring all voltages in the system, particularly the system voltage.

When they respond (or-operation), the units 12 and 16 cause erasure of the data in the SRDI memory.

The unit 13 can only produce a status change and can only be queried by the processor during the operation or given the system start of the program of the security module.

The temperature sensor monitors the operating temperature of the module and triggers a reset if the temperature drops below a predefined value or rises above another predefined value. Improper use thus is prevented and the user data are protected. A reset is likewise triggered when the input voltage of the module is too low or too high or when the internal operating voltage drops below a specific level. The status of all other voltages can be interrogated by the system software. The security module 100 contains an LED (not shown) for status indication and is cast with a hard, opaque casting compound 105 in which a sensor membrane 153 is embedded. One of the event detectors, the destruction detection unit 15, is connected to conductor loops of the sensor membrane 153.

Figure 2:
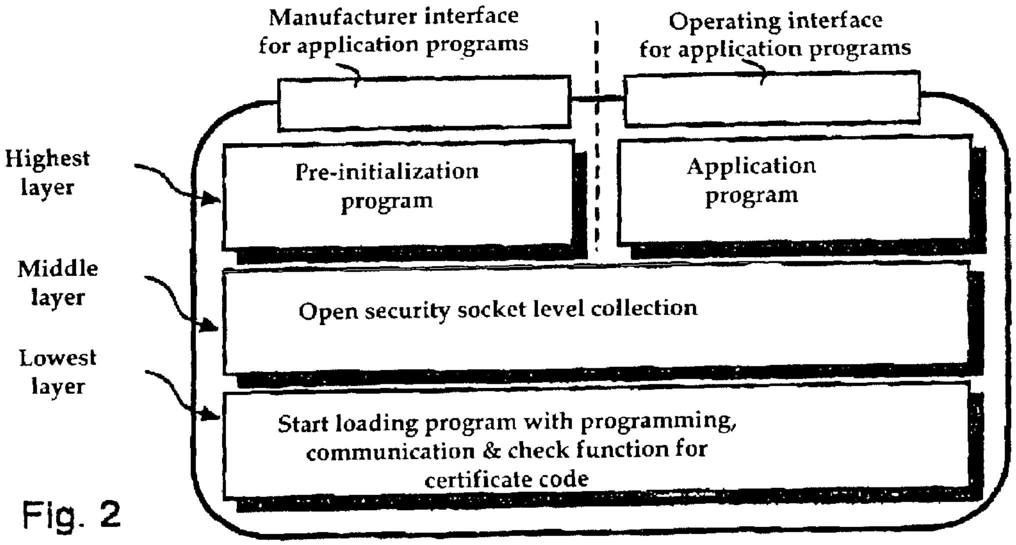
FIG. 2 is an illustration of the multi-layer program architecture of the inventive security module.

FIG. 2 shows an illustration of the multi-layer program architecture. A pre-initialization program and an application program are located in the highest layer. The pre-initialization program is loaded via a manufacturing application programming interface after the manufacture of the hardware of the security module and initiates the generation of the public key pair that creates a unique identity. The latter enables the security module to be recognized again at any time. The initial, cryptographically unique identity can be replaced later by the cryptographic identity of the customer. The application program defines the regular functionality during the operation of the security module. It is available via an operational application programming interface and can, for example, correspond to the PKCS#11 or to some other cryptographic standard.

An open secure socket layer library is located in the middle layer; the layers (pre-initializer and application software) lying above this can use it. The collection (open SSL library) contains a large number of sets of cryptographic algorithms (DES triple-DES, RSA, DAS, SHA-1, HMAC, etc.) and PKCS and ASN.1 formatting tools such as, for example, the X.509v3 certification standard. The open SSL library also contains a small and efficient collection of elliptic curve digital signature algorithms (ECDSA) that allow a selection of one or more different elliptical curves—that are recommended by NIST.

The loader contains a start loading program (boot loader with an integrated code-checking program. The start loading program first undertakes a loading of the pre-initialization program that, once loaded and implemented, cannot be replaced by a different pre-initialization program but at most by a part of the application program. Before the start loading program stores the status of a loaded part of the application program as being valid, the latter is checked by means of certificate code. The certificate code is offered together with each part of the application program. A code-checking key is required for the review, this being loaded during the manufacture during the framework of a pre-initialization.

A hash value is formed from the data of the application program, this being encrypted to form a message authorization code (MAC), for example with a key according to the known DES method (data encryption standard). The MAC is attached to the application program as certificate code. The code review key, however, must be stored in the security module protected against readout when the code review key is a key of a symmetrical encryption method (DES).

Read-out protected storage is not needed if a public code review key is loaded. Preferably the code review key is a public verification key, and the public verification key and an appertaining, secret signing key form a key pair, and the certificate code is generated by the manufacturer using the secret signing key and appertains to the data of at least a part of an application program. To that end, a hash value is formed from the data of the application program, this being encrypted to form a digital signature, for example with a secret signing key according to the known RAS method (Rivest, Shamir and Adleman). The code review key is generated, stored and constantly checked for veracity by a trustworthy center of the manufacturer, whereby the manufacturer utilizes a world-wide public key infrastructure. The following standards exist for the public key infrastructure that is employed:

[1] American National Standards Institute: Public Key Infrastructure—Practices and Policy Framework: ANSI X9, 79, 2000

[2] ISO/CCITT Directory Convergence Document: The Directory-Authentication Framework; CCITT Recommendation X.509 and ISO 9594-8, "Information Processing Systems—Open Systems Interconnection—the Directory-Authentication Framework".

[3] ISO_9594-8a 95 ISO/IEC 9594-8; Information technology—Open Systems Interconnection—Specification—The Directory: Authentication framework; ISO/IEC International Standard, Second edition 15.09.1995.

[4] ISO_10181-2 96 ISO/IEC 10181-2 Information technology—Open Systems Interconnection—Security frameworks for open systems; Authentication framework; ISO International Standard 10181-2, 1st edition, 96.05.15, 1996.

[5] Bruce Schneier: Applied Cryptography: Protocols, Algorithms, and Source Code In C: (2nd ed.) John Wiley & Sons, New York 1996, Chapter 24.9

[6] Simson Garfinkel, Gene Spafford: Web Security & Commerce (Section III Digital Certificates; O'Reilly & Associates, Cambridge 1997.

Figure 3:
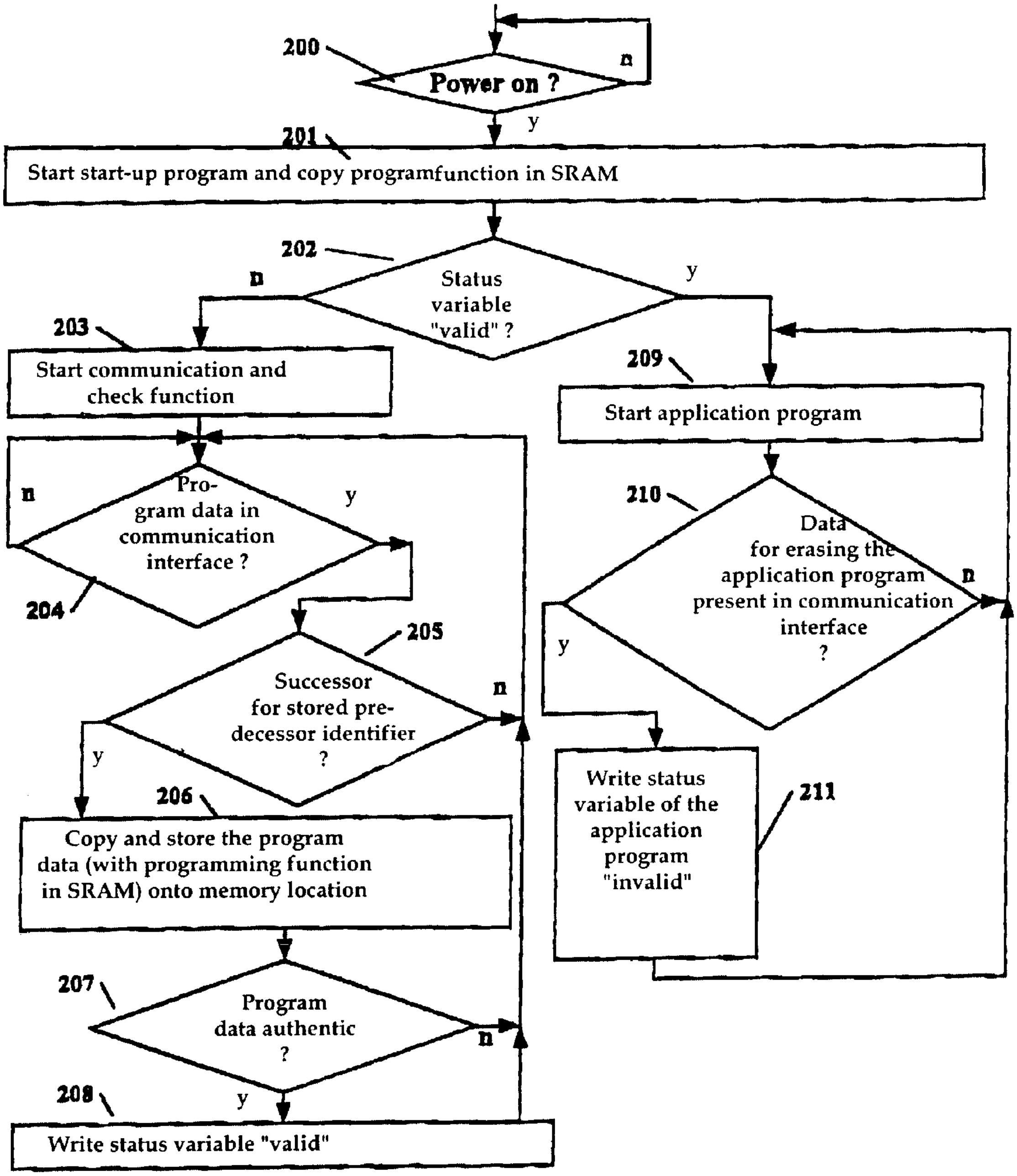
FIG. 3 is a flow chart for modifying the functionality of the inventive security module.

FIG. 3 shows a flowchart relating to the modification of the functionality of the security module.

After a manufacturer device (not shown) is turned on, energy is made available and a check is made in Step 200 to determine whether the turn-on had the intended result, so that a system voltage is present at the security module. If not, then a branch is made to a wait loop and the query is constantly repeated. When the system voltage is present at the security module, a startup program is started in Step 201 and at least a first part of the start loading program with the programming functionality is copied into the main memory SRAM 121. The microprocessor 120 is programmed by the start loading program so that the memory area of the FLASH program memory wherein the start loading program is located can only be copied but not overwritten. Information about an application program that was already loaded can be stored in non-volatile fashion at another memory area of the FLASH program memory 128 or at some other location. The information includes a status variable. In the subsequent program execution, the microprocessor determines in Step 202 on the basis of this information whether a valid status of an application program is present. If so, then the application program is started in Step 209. Subsequently, a constant check is made in Step 210 to determine whether data for erasing the application program are present in the communication interface. When this is not the case, then a branch is made back to the Step 209 and the application program is started. Otherwise, a branch is made from Step 210 to a Step 211 wherein the existing application program is identified as "invalid" by means of a status variable.

At the next booting, the start loading program (boot loader) is reactivated and can store new application program data First, the microprocessor determines in Step 202 that the existing application program has been characterized as "invalid", or, that there is no valid status of the application program; a branch is then made from Step 202 to Step 203 wherein a second part of the start loading program is started with a communication interface call and a functionality check. A check is made in a following query Step 204 as to whether application program data and identifier data are present in the communication interface. When this is not the case, then a branch is made to a waiting loop and the query is constantly repeated. Given a positive result in Step 204, a branch is made to a query Step 205 wherein a check is made to determine whether the identifier data identify a successor of the stored predecessor. To that end, the microprocessor compares the supplied identifier data to store identifier data. The identifier data can be stored in the further memory area of the FLASH program memory wherein all information about a program that has already been loaded are listed. The manufacturer also supplies information data belonging to the application program data at the communication interface, such as: start and end address of the program, check sum (CRC), program type, version, revision. The identifier data include the program type, the version data and the revision data.

If the identifier data in the communication interface do not relate to a successor of the stored predecessor, a branch can be made back to a waiting loop to Step 204. If the identifier data present in the communication interface relate to a successor of the stored predecessor, then a branch is made to a Step 206. The microprocessor is controlled with the programming functionality corresponding to the aforementioned, first sub-program of the start loading program. The copied application program data are stored at a memory location of the program memory provided for the application program.

A validity certificate, for example a cryptographic signature, belonging to the application program is used in the following query Step 207 for checking the legitimacy of the application program. When, however, no legitimacy is present, then a branch is made back to the query Step 204. In the following Step 208, a verified application program initiates storage of information about a valid status in non-volatile fashion, and a branch is then made back to the query Step 204. Given authenticity of the loaded program part (including at least one part of the application program, for example) a status variable is stored in the non-volatile memory of the security module or is written into the aforementioned, further memory location for information data that identify said loaded program part as valid. Preferably, the status variable is a flag with which the loaded application program is identified as valid after a cryptographic signature was verified that proves the authenticity of the loaded application program.

New, valid program data, whose appertaining identifier data identify a successor are only written onto a memory location only when the program that already exists was previously identified in the Step 211 with the status variable "invalid". The latter assumes that data for erasing the application program are present in the communication interface (Step 210).

As a result of the modification of its functionality that is thereby achieved, the security module can be adapted to various devices and can be utilized for performing a multitude of jobs.

The security module, which is intended primarily for utilization in postal devices, particularly for utilization in a postage meter machine, is referred to as postal security device or as security accounting device. A PSD, just like an SAD, is based on an identical hardware. The PSD uses an asymmetrical encryption algorithm (RSA, ECDSA), but the SAD uses a symmetrical encryption algorithm (DES, triple-DES). The security module also can include further structure that allows it to operate in different devices. The invention enables the security module to be plugged, for example, onto the motherboard of a personal computer that, as PC franker, drives a commercially obtainable printer.

Although modifications and changes may be suggested by those skilled in the art, it is the intention of the inventors to embody within the patent warranted hereon all changes and modifications as reasonably and properly come within the scope of their contribution to the art.

We claim:

1. A security module having a modifiable functionality, comprising:

a microprocessor;

a reprogrammable program memory in communication with said microprocessor, containing a current application program with associated identifier data, and a start loading program;

a main memory in communication with said microprocessor and said program memory;

a communication interface in communication with said microprocessor, at which data representing a modified application program and associated identification data and an associated certification code are provided; and upon start-up, said microprocessor causing at least a portion of said start loading program to be copied from said program memory into said main memory and said microprocessor being operated by said start loading program in said main memory to store data representing at least a portion of said modified application program in a free area of said program memory when the identification data associated with said modified application program identify said modified application program as a successor to said current application program based on the identification data associated with said current application program, and to authenticate said portion of said modified application program dependent on said certification code and, given authenticity, to store said portion of said modified application program, in said program memory as a valid program.

2. A security module as claimed in claim 1 wherein said program memory is a FLASH program memory, and wherein said communication interface includes an internal controller and a communication buffer from which data that are read in first are read out first and are forwarded.

3. A method for modifying a functionality of a microprocessor-operated security module comprising the steps of:

storing a start loading program in a program memory in a security module, said program memory being accessible by a microprocessor in said security module;

upon start-up, at least partially copying said start loading program into a main memory in said security module, said main memory also being accessible by said microprocessor;

executing at least said portion of said start loading program copied into said main memory and identifying a program status achieved in the execution of start loading program, and modifying a functionality of said security module using a modified program dependent on said status; and authorizing modified functioning of said security module using said modified program after verifying an authenticity of at least a portion of said modified program.

4. A method as claimed in claim 3 comprising providing at least a part of an application program, as said modified program, with an associated certificate code and identifier data at a communication interface in communication with said microprocessor, and storing at least a portion of said application program in a free memory location of a program memory accessible by said microprocessor if said identifier data associated with said application program identifies said application program as a successor to a predecessor identifier, and checking the authenticity of said application program using said certificate code and, given authenticity of said application program, storing said at least a portion of said application program as a valid program in said program memory.

5. A method as claimed in claim 4 comprising, giving authenticity of said at least a portion of said application program, storing a status variable characterizing said portion as valid.

6. A method as claimed in claim 3 comprising providing a code checking key for checking the authenticity of said modified program.

7. A method as claimed in claim 6 comprising storing a secret key of a symmetrical encryption method as said code checking key during manufacture of said security module, and storing said code checking key in said security module protected against readout.

8. A method as claimed in claim 6 comprising loading a public verification key, as said code checking key, in said security module during manufacture, said public verification key forming a key pair with a secret signing key, and comprising generating said certificate code with said secret signing key.

9. A method as claimed in claim 4 comprising determining in said microprocessor whether said identifier data associated with said portion of said application program characterize a successor to a stored predecessor identifier by comparing said identifier data to comparison data in a further memory area of said program memory wherein information data for a current program are loaded and listed.

10. A method as claimed in claim 9 comprising supplying said information data via a communication interface, said information data comprising a start address and an end address of said application program, a check sum and said identifier data.

11. A method as claimed in claim 10 wherein said identifier data comprise a program-type, version and revision data.

12. A method as claimed in claim 3 comprising storing a status variable in said program memory for verifying said program status.

13. A method as claimed in claim 12 comprising storing said status variable as a flag which characterizes said portion of said application program as valid after a cryptographic signature verifies authenticity of said portion of said application program.

14. A method as claimed in claim 3 comprising storing a status variable for verifying said program status in a non-volatile memory of said security module.

15. A method as claimed in claim 14 comprising storing said status variable as a flag which characterizes said portion of said application program as valid after a cryptographic signature verifies authenticity of said portion of said application program.

* * * * *